LIST FINDER

Filed April 22, 1953 4 Sheets-Sheet 1

Inventor:
William Lang
BY Harry B. Cook,
Attorney.

Sept. 13, 1955 W. LANG 2,717,605

LIST FINDER

Filed April 22, 1953 4 Sheets-Sheet 2

Inventor:
William Lang

BY Harry B. Cook,
Attorney.

Inventor:
William Lang
BY Harry [signature]
Attorney.

LIST FINDER

Filed April 22, 1953

Inventor:
William Lang

BY Harry A. Book,
Attorney.

United States Patent Office 2,717,605 Patented Sept. 13, 1955

2,717,605

LIST FINDER

William Lang, Verona, N. J., assignor to The Bates Manufacturing Company, Orange, N. J., a corporation of New Jersey Application April 22, 1953, Serial No. 350,480

1 Claim. (Cl. 129—17)

This invention relates to a card holder of the type comprising a base or support having mounted thereon for swinging movement a stack of similar, flat, rectangular sheets or cards, and a rectangular flanged cover which is hinged to the base and is adapted to overlie the stack of cards or sheets on the base.

More particularly the invention is directed to a list finder or index device by which easy and quick reference may be had to, for example a list of telephone numbers, addresses, recipes, or other classifiable matter, there being one or more cards for each classification; and one object of the invention is to provide novel and improved means for separably hingedly connecting the cards or sheets to the base so that they can be easily and quickly connected to and detached from the base for any desired purpose such as revision or replacement.

Another object is to provide a card holder of this general character wherein the base and hinged cover shall have cooperative elements for holding and hinging the cards, the base, cover and said elements being so constructed and combined that said elements are automatically brought into card-holding and hinging position or separated to permit insertion and removal of the cards when the cover is swung in opposite directions respectively.

A further object is to provide a card holder including such a combination of base, cover and card-holding elements, with the addition of means for automatically swinging the cover into and holding it in a vertical or open position to expose the cards or sheets and for permitting said cover to be swung beyond said vertical position so as to separate the card-holding elements on the cover and base to permit the easy insertion or removal of cards onto or from said card-holding elements.

Other objects, advantages and results of the invention will be brought out by the following description in conjunction with the accompanying drawings in which Figure 1 is a top plan view of a list finder or card holder embodying the invention and showing the cover in closed position;

Figure 1:
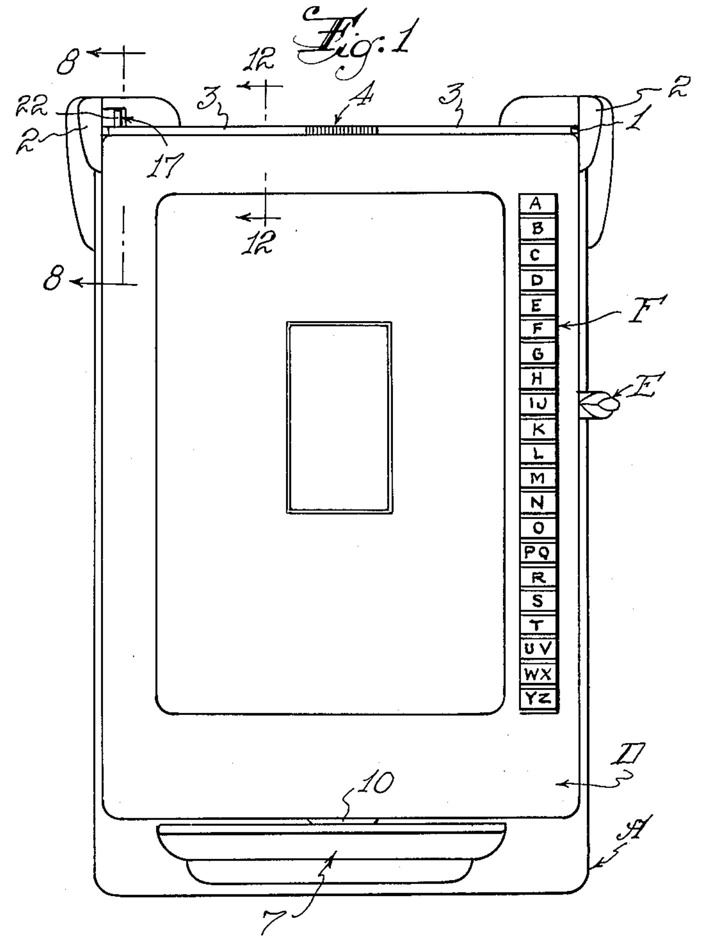
Figure 3:
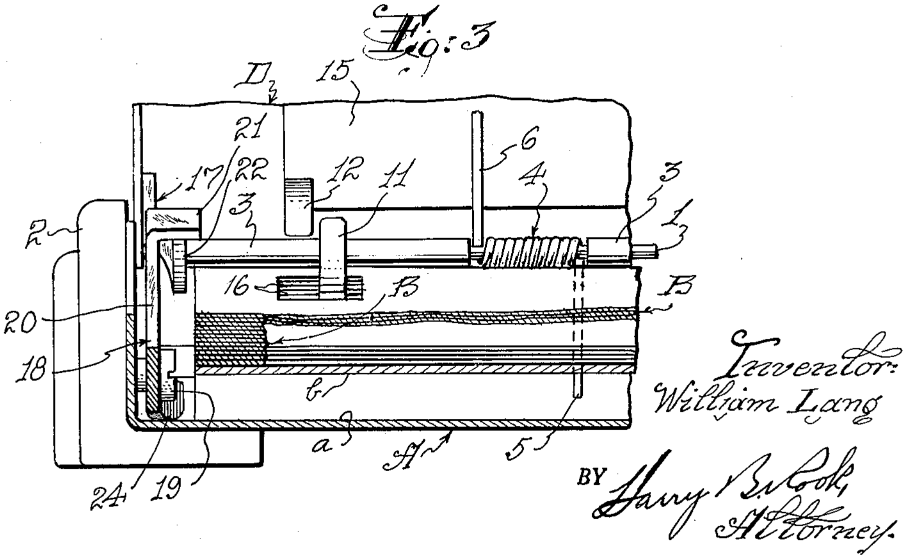
Figure 3 is an enlarged fragmentary transverse vertical sectional view approximately on the plane of the line 3—3 of Fig. 2.
Figure 6:
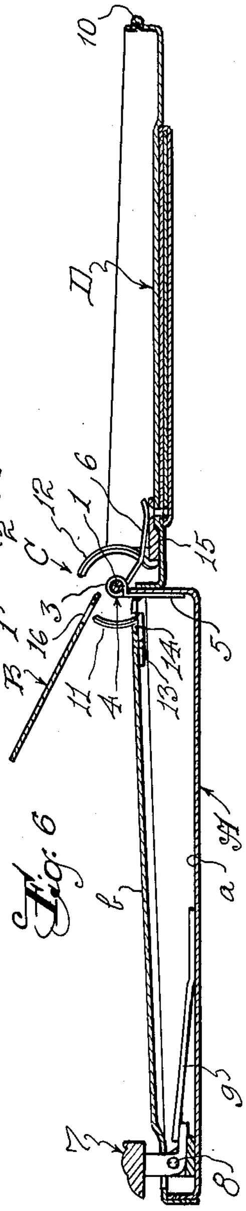
Figure 6 is a transverse vertical sectional view approximately on the plane of the line 6—6 of Fig. 5.
Figures 8, 9, 10, 11, 12, 13, 14, 15:
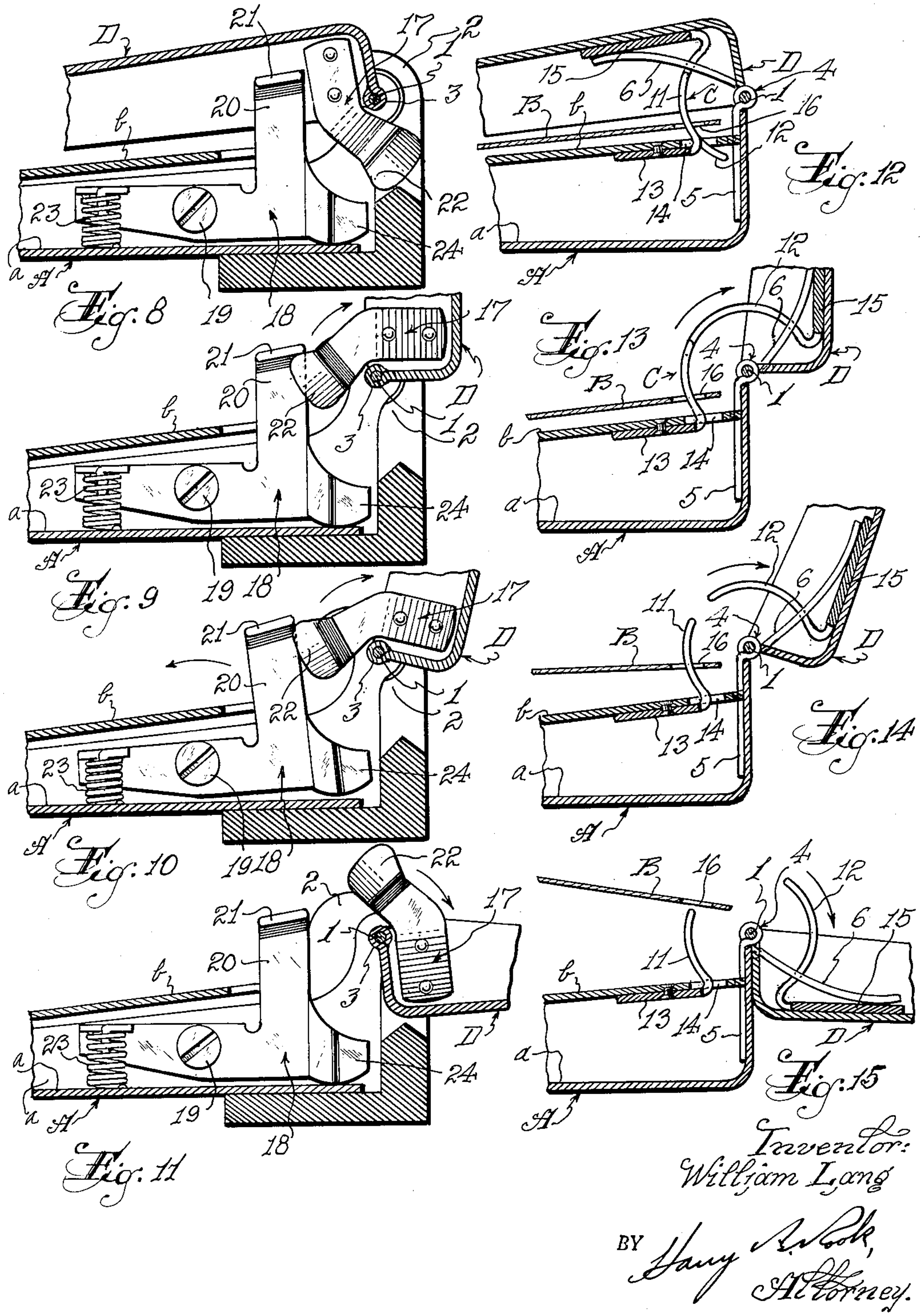
Figure 8 is an enlarged fragmentary vertical sectional view approximately on the plane of the line 8—8 of Fig. 1.
Figure 9 is a similar view showing the cover in vertical open position.
Figure 10 is a view showing the cover being forced beyond the open position.
Figure 11 is a view similar to Fig. 10 showing the cover swung into a position in approximately horizontal alignment with the base.
Figure 12 is a vertical sectional view on the plane of the line 12—12 of Fig. 1 showing the cover in the closed position corresponding to the position illustrated in Fig. 8.
Figure 13 is a view similar to Fig. 12 but showing the cover in the same position as illustrated in Fig. 9.
Figure 14 is a like view showing the cover in the same position illustrated in Fig. 10.
Figure 15 is a view similar to Fig. 14 showing the cover in the same position as that illustrated in Fig. 11.

The list finder comprises an approximately flat and horizontal base or support A that is shown as comprising a box-like bottom section *a* and a top section *b* of a length and width to support flatwise in a stack a plurality of superposed cards or sheets B that are hingedly connected to the base by combined card-holders and card-hinges C. At one end of the base is hingedly connected a cover D, the hinge connection being shown as comprising a pivot rod 1 having its ends secured in bearing blocks 2 at opposite longitudinal sides of the base, which rod extends through hinge tubes or eyes 3 on the edge of the cover so that the cover may swing about the rod as a pivot. A helical spring 4 has one end 5 bearing against an end wall of the base and its other end 6 bearing against the underside of the cover for normally influencing the cover upwardly away from the base and into substantially horizontal alignment with the base as shown in Figure 6. Normally the cover overlies the stack of cards B as shown for example in Figures 4 and 12 and is releasably held in this position by a suitable latch 7 that is pivotally mounted at 8 on the end of the base opposite the hinge rod 1 and normally influenced by a spring 9 into a position to engage a rib 10 on the swinging end of the cover to hold the cover in closed or card enclosing position as shown in Figures 1, 8 and 12. The cover may be released to swing upwardly by simply pressing on the latch 7 to disengage the latter from the rib 10, and means to be hereinafter described is provided for normally stopping such upward movement when the cover is in approximately perpendicular relation to the base.

Figure 2:
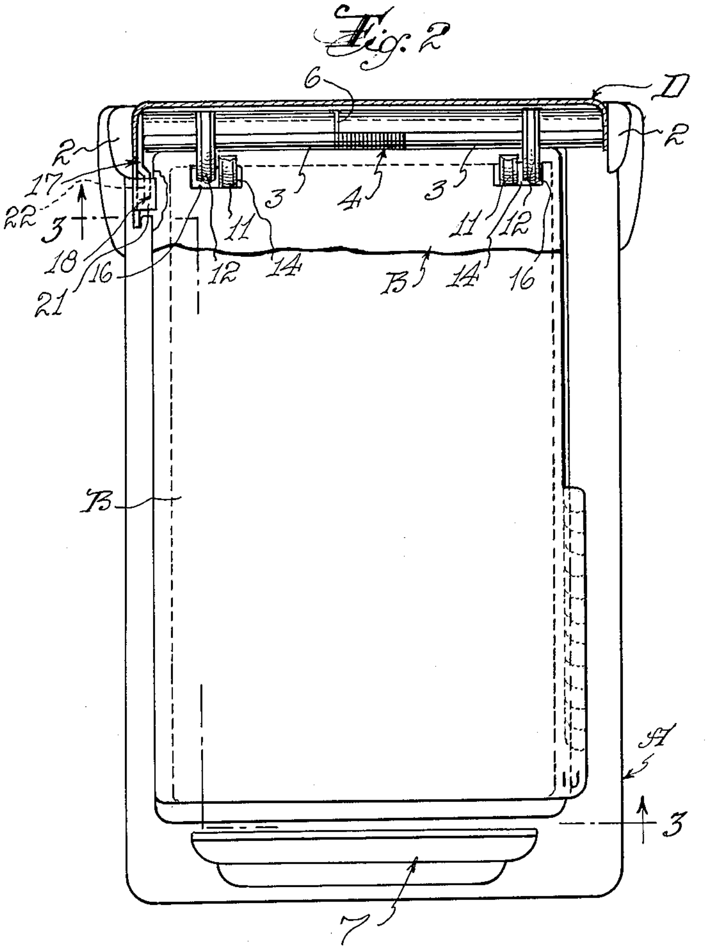
Figure 2 is a similar view showing the cover in open position and in horizontal section.
Figure 5:
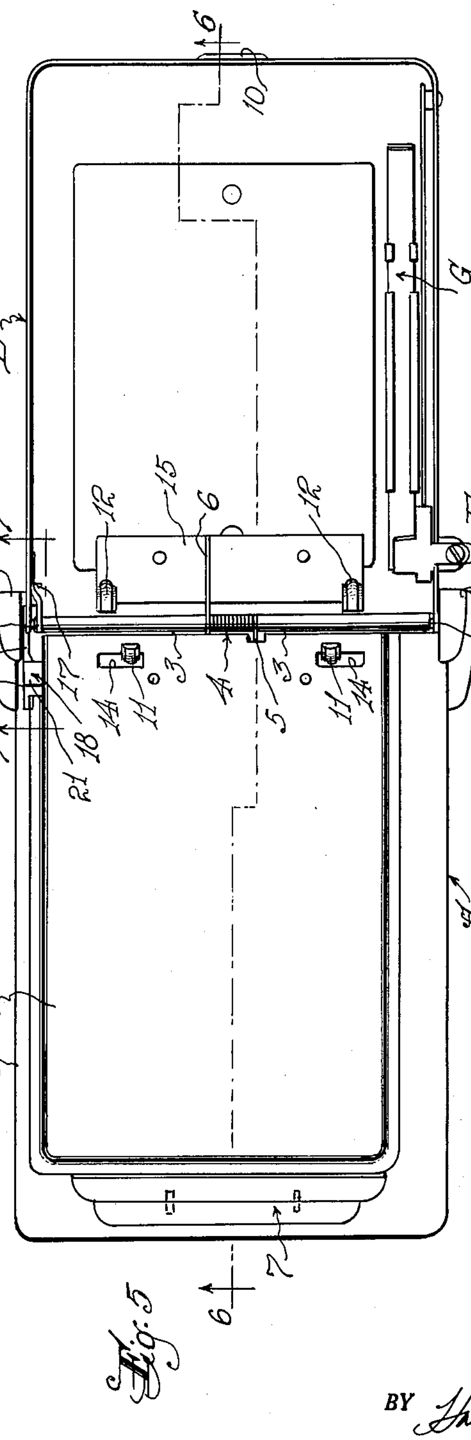
Figure 5 is a top plan view of the card holder or list finder with the cover swung beyond the open position to separate the card-holding and card-hinging elements.

In accordance with the invention, each combined card holder and hinge C comprises two sections 11 and 12 one of which is mounted on the base while the other is mounted on the cover and these sections are so formed and related to the cover and the base that when the cover is disposed in approximately horizontal alignment with the base as shown in Figs. 5, 6 and 15, said sections are separated from each other to permit the insertion and removal of cards B while when the cover is in its closed position or in its normally open position in vertical relation to the base as shown in Figs. 2, 12 and 13, the sections 11 and 12 are so related as to positively hold the cards in hinged relation to the base.

Figure 4:
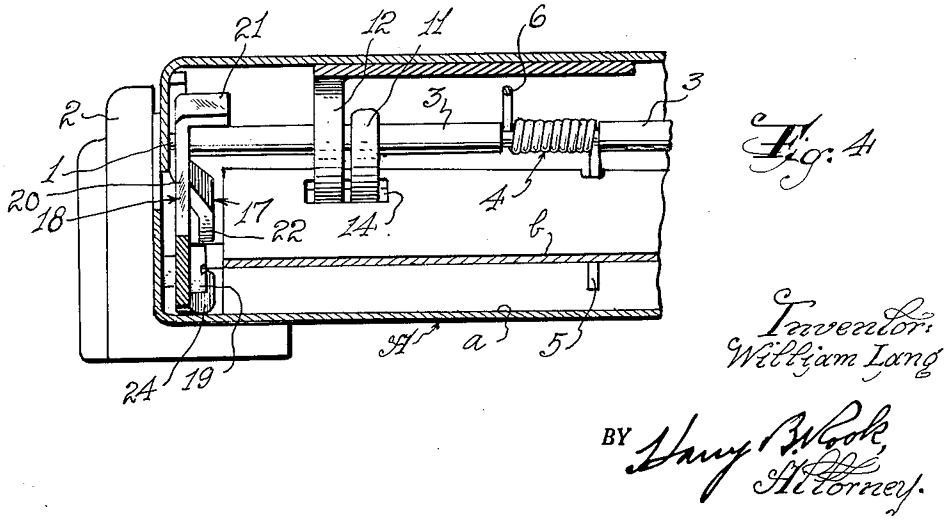
Figure 4 is a similar view but showing the cover in closed position and with the cards removed.
Figure 7:
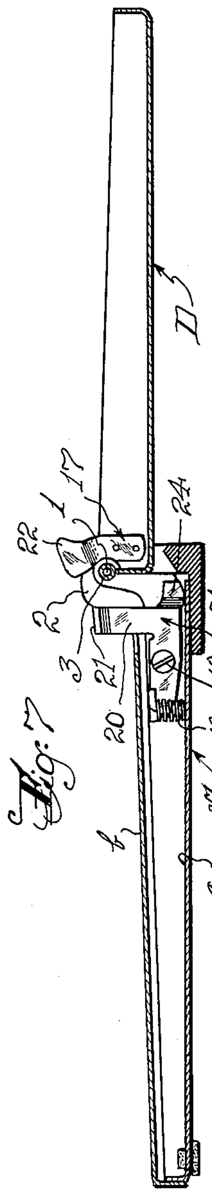
Figure 7 is a similar view on the plane of the line 7—7 of Fig. 5.

More specifically, each section 11 and 12 of the combined card holder and hinges has one end fixedly connected to the corresponding base and cover and its other end portion arcuate and concentric with the axis of the rod 1, said sections of each card holder and hinge being arranged in different planes spaced apart longitudinally of the rod 1; and said arcuate portions are of such lengths that they are disposed side by side with their extremities overlapping when the cover is in closed or normally open position as shown in Figures 4 and 12, and the extremities are spaced apart when the cover is swung beyond said normal open position into horizontal alignment with the base as shown in Figs. 6, 14 and 15. Desirably, the two sections 11 are formed integral at one end with a plate 13 that is riveted or otherwise secured to the underside of the top section *b* of the base with the arcuate portions projecting upwardly through openings 14 in said top section of the base with their other ends free, while the sections 12 are formed at one end integrally with a plate 15 that is riveted or otherwise rigidly secured to the underside top of the cover with the other ends of such sections free.

Each card has two slots 16 adjacent one end thereof each to receive the two sections 11, 12 of one of the combined card holders and hinges C, and when the cover is swung beyond the vertical normal open position, the sections 11 may be slipped through the slots 16 to permit connection or detachment of the cards to or from the base, while when the cover is in its normal open position or its closed position, the cards will be prevented from slipping off the sections 11.

Another feature of the invention is means for normally limiting upward swinging of the cover to the normal vertical open position and yet permit the cover to be forceably swung beyond said vertical open position into horizontal alignment with the base. This means is shown as comprising an arm 17 rigidly secured to one side of the cover and cooperating with a detent 18 pivotally mounted on the corresponding side of the base. The detent 18 comprises a lever pivotally mounted by a screw 19 on the base and having an angularly disposed arm 20 projecting upwardly and formed with an inwardly projecting finger 21 in the path through which the arm 17 swings as the cover is opened and closed. The arm 17 has a curved free end portion 22 to engage the underside of the finger 21 when the cover is in its normal vertical open position as shown in Fig. 9 so as to limit swinging of the cover to said open position. However, the finger 21 is yieldingly held in the path of swinging of the arm 17 by means of a spring 23 so that upon application of manual pressure to the cover tending to force the cover beyond said open position and into horizontal alignment with the base, the finger 21 will be pushed by the arm 22 against the influence of the spring 23 out of the path of swinging of the arm as shown in Fig. 10 so that the spring 4 may then swing the cover into horizontal alignment with the base as shown in Fig. 11. The finger is immediately returned to its horizontal normal position by the spring 23 and is limited in its return by a finger 24 that engages the bottom section 1 of the base. When the cover is pulled back to normal open position or to closed position, the arm 17 will momentarily displace and slip past the finger 21.

Where the cards are to be used in a list finder or the like, they may have one edge notched distances from their hinged ends which progressively increase from the uppermost to the lowermost cards, in known manner as indicated at 25, to cooperate with a card selector E of known construction that is slidably mounted at one longitudinal edge of the cover along an index F which has characters corresponding to the characters on the cards; for example, the uppermost card will have the letter A thereon corresponding to the letter A of the index. The card selector E is frictionally held in its adjusted position by a flat spring G in known manner. The card selector and index form no part of this invention and may be of any suitable type.

In operation of the list finder as described, and assuming that all of the cards are in position, in order to select an index card the card selector E is pushed into juxtaposition to the proper letter or character on the index, whereupon the latch 7 is depressed to release the cover D which is then swung upwardly by the spring 4 until the end 22 of the arm 17 engages the finger 21 of the detent 18, whereupon the cover is stopped and held in its vertical normal open position (see Figs. 2, 9 and 13). In this position, the sections 11 and 12 of the combined card holders and hinges overlap each other as shown in Fig. 13 to hold and hinge the cards on the base and permit the cards above the one selected to move with the cover. When it is desired to remove or add a card, the cover is pushed manually beyond the open position to cause disengagement of the arm 22 from the detent as shown in Figs. 9 and 14, whereupon the spring will actuate the cover into horizontal position in alignment with the base and beyond the end of the base to which the cover is hinged as shown in Fig. 15. The cards may then be slipped over or removed from the sections 11 of the card holders and hinges as shown in Figs. 6 and 15, or if desired the cards can be slipped on to or off the sections 12.

Preferably the top surface of the top section B of the base slopes downwardly from the arcuate portions of the card holder sections H so that the cards will slide downwardly by gravity so as to cause the edges of the slots 16 in the card to be held in contact with the card holder sections, thereby to position the slots in the cards in proper relation to the card holder sections to avoid interference of the ends of the sections 12 with the cards at the edges of the slots.

It will also be understood by those skilled in the art that the card holder sections 11 and 12 could be disposed in the same plane transverse of the axis of the rod 1 with the sections disposed different distances from the axis of the rod so that the sections could overlap each other in superposed relation rather than in side-by-side relation as shown.

It will of course be understood that the so-called cover need not actually serve to enclose the cards; its prime function is to carry the card-holding and hinge sections to cooperate with complemental sections on the base. Conveniently it may also serve as a carrier for the card selector E, as shown.

To avoid circumlocution, the word "cover" is used in the appended claims to cover any element hingedly connected to the base and carrying one of the card-holder sections, and the word card-holder is inclusive of but not limited to a card hinge.

The now preferred embodiment of the invention has been described for the purpose of illustrating the principles of the invention but many modifications and changes can be made in the details of the construction of the card holder or the list finder within the spirit and scope of the invention.

I claim:

A holder for perforated cards, comprising an approximately flat and horizontal base of a length and width to support a card flatwise, a cover pivotally connected to said base to swing to and from an overlying relation to said base, means normally urging said cover in one direction away from said base-overlying relation, releasable means for normally holding said cover in said overlying relation to the base, means limiting movement of said cover in said one direction away from said base-overlying relation into approximately perpendicular relation to said base and for permitting said cover to be forced in the same direction beyond said perpendicular relation, the last-named means including an arm on said cover and a detent on said base normally yieldingly held in the path of movement of said arm as the cover is swung to perpendicular relation to limit movement of said cover under the influence of the first-named means, said detent being displaceable out of said path by said arm upon application of pressure to the cover to force the cover beyond said perpendicular relation, said detent comprising a lever pivotally mounted intermediate its ends on said base and having an angularly disposed portion projecting upwardly and formed with an inwardly projecting finger in the path of said arm, and a spring normally actuating said lever to yieldingly hold said finger in said path of movement of said arm, said arm having two surfaces to engage said finger upon movement of said cover beyond said perpendicular relation and upon return movement of said cover to said base-overlying relation, respectively, to move said finger against the influence of said spring out of the path of movement of said arm, and a card holder including one section connected at one end to said cover and projecting from the underside thereof with the other end free another section connected at one end to said base and projecting upwardly therefrom with one end free, said sections having the free end portions insertable through a perforation in a card and overlapping each other when the cover is in any relation to the base between and including said overlying relation and said perpendicular relation to hold the card on the base, the free ends of said portions being spaced apart when the cover is swung in said direction beyond said perpendicular relation.

References Cited in the file of this patent

UNITED STATES PATENTS

| | | |
|---|---|---|
| 2,288,189 | Guinane | June 30, 1942 |
| 2,513,422 | Neilsen | July 4, 1950 |
| 2,524,209 | Pollock | Oct. 3, 1950 |